Inventor
Herbert Schrader.
By N. E. Dunlap
Attorney

Patented Dec. 30, 1924.

1,521,328

UNITED STATES PATENT OFFICE.

HERBERT SCHRADER, OF WHEELING, WEST VIRGINIA, ASSIGNOR TO WHITAKER-GLESSNER COMPANY, OF WHEELING, WEST VIRGINIA, A CORPORATION OF WEST VIRGINIA.

METHOD OF AND APPARATUS FOR CUTTING AND APPLYING RING LINERS TO CAN COVERS.

Application filed December 17, 1921. Serial No. 523,020.

*To all whom it may concern:*

Be it known that I, HERBERT SCHRADER, a citizen of the United States of America, and resident of Wheeling, County of Ohio, and State of West Virginia, have invented certain new and useful Improvements in Methods of and Apparatus for Cutting and Applying Ring Liners to Can Covers, of which the following is a specification.

This invention relates broadly to apparatus for cutting ring liners and applying the same to can ends or covers.

The primary object of the invention is to provide a machine embodying continuously advanced mechanisms whereby gaskets, or ring liners, are cut and applied during the continuous advance movement, thus eliminating the well-known serious objections inherent in those machines which have intermittent, or step-by-step, advance movement and in which the cutting of the ring liners and the deposit thereof in the can covers are performed in the intervals of rest.

A further object is to provide a die mechanism by which the annulus or ring liner is completely formed from a traveling web or strip of paper or other gasket material at a single stroke, by which the core or central portion removed in the formation of the liner is ejected, and by which the liner is deposited in place in the channel of a can cover.

A still further object is to provide mechanism by which the paper web or strip is unwound uninterruptedly from a roll at a uniform rate and is then advanced intermittently to present its end portion in ring-liner cutting position, successive advance movements being throughout a distance approximately corresponding to the diameter of the liners and at a speed corresponding to the rate of travel of the die-mechanism by which liners are cut.

With these and other important objects in view, the invention resides in the features of construction, arrangement of parts and combinations of elements which will hereinafter be exemplified, reference being had to the accompanying drawings, in which—

Referring to said drawings, 1 indicates a base which may be of any appropriate form, but which is herein shown as comprising a horizontal elevated bed-plate or platform 1ª. Journaled in suitable bearings carried by said base below said bed-plate is a horizontal drive-shaft 2 which carries a gear wheel 3 in driving relation to an idle gear 200 which, in turn, drives a gear wheel 4 mounted on a countershaft 5 which is journaled in bearings carried upon the top of said bed-plate. Fixed on said countershaft adjacent to its inner end is a bevel pinion 6 disposed in underlying driving relation to a bevel gear 7 fixed upon a vertical shaft 8 which has its lower end journaled in an upright boss-like bearing 9 carried by or formed on the bed-plate 1ª in an approximately central position. The upper end of said shaft 8 is journaled in the head portion 10ª of a supporting standard or column 10 of angular crane-like form which is mounted upon said bed-plate at or adjacent to one end of the latter.

Fixed upon and rotatable with the vertical shaft 8 is the central sleeve portion 11ª of a circular horizontally disposed turret or carrier 11. Also fixed upon said shaft in underlying relation to said turret is the sleeve portion 12ª of a horizontal support table 12, said sleeve portion having a ball-thrust bearing 13 interposed between its lower end and the hub of the bevel gear 7.

Posts 14 borne by the table 12 have their upper ends underlying the turret 11. Said posts have threaded into their upper ends the lower ends of vertical bolts 15 which are directed through radially-disposed spider-like arms 16 formed on the top of the turret 11. Located at regularly spaced intervals around the table and herein shown as formed integral with the latter is a plurality of upright guideways 17 of approximately semi-cylindrical form in each of which is disposed the head 18 of a vertically movable plunger 19, said head having on opposite sides thereof vertically disposed ribs 20, which are closely fitted for travel within guide channels 21 provided in opposite walls of said guideways 17. Said head 18 is of hollow cylindrical form and carries upon the top thereof a die punch 22 of reduced diameter adapted to receive the central disk-shaped cores removed in the formation of ring liners. Below the cylindrical portion thereof said head has its inner wall inclined downwardly and outwardly, as clearly shown in Fig. 7, to form an inclined surface over which the central disk-shaped cores removed in the formation of the ring liners are discharged.

Each plunger 19 is designed to have the die punch 22 thereof cooperate with an overhanging die 23 for cutting ring liners from a traveling web 24 of paper as the latter is unwound from a roll 25. Said die punch operates through vertically alined openings 26 and 27 provided, respectively, in relatively spaced horizontal ledges 28 and 29 which are rigidly carried in annular relation to the turret 11. As unwound from the roll 25, the paper web 24 is drawn across the upper ledge 28 at one side of the machine in a position in which it is crossed by each of the various sets of dies as the turret is rotated. The paper web is unwound from the roll 25 and is fed forward across said ledge 28 in a direction substantially tangential to the turret by means of two sets of rolls 30 and 31 which are journaled in suitable bearings provided on upright companion frame members or supports 32 mounted stationarily upon the bed-plate or platform 1ª at or adjacent to the end of the latter opposite that which carries the supporting standard or column 10.

Continuous rotation is communicated to the outermost set 30 of said paper feeding rolls in any appropriate manner, as by sprocket chains and gearing arranged to impart to said rolls the required speed. As herein shown, said gearing includes a sprocket wheel 33 on the rear end of the drive-shaft 2 connected by a sprocket chain 34 to a sprocket wheel 35 carried by a shaft 36 journaled in bearings carried by the supports 32. A second sprocket wheel 37 carried by said shaft 36 is connected by a sprocket chain 38 to a sprocket wheel 39 fixed on a shaft 40 which also carries a gear wheel 41 in driving relation to a gear wheel 42 located on the adjacent neck of the lower roll of said set 30 of the feed rolls. The upper roll of said set carries a gear wheel 43 which is in mesh with and is positively driven by said gear wheel 42.

The shaft 36 has an arm 44 fixed thereon intermediate its ends, and carried by said arm is an outwardly directed pin 45. Said arm and pin together constitute the driving member of an intermittent gearing of Geneva type, of which the driven member consists of a radially slotted wheel or disk 46 fixed on a shaft 47 journaled in bearings provided therefor on the supports 32. Also carried by said shaft 47 is a gear wheel 48 in mesh with an idle gear 49 mounted upon a stub shaft 50 which is adjustable in a slot 51 in one of said companion supports 32. Said idle gear is disposed in driving relation to a gear wheel 52 carried by an end of the lower roll of the inner set 31 of the paper feeding rolls. The upper roll of the last mentioned set is driven from the lower roll through intermeshing gears carried by the opposite ends of said rolls.

Figures 10, 11:
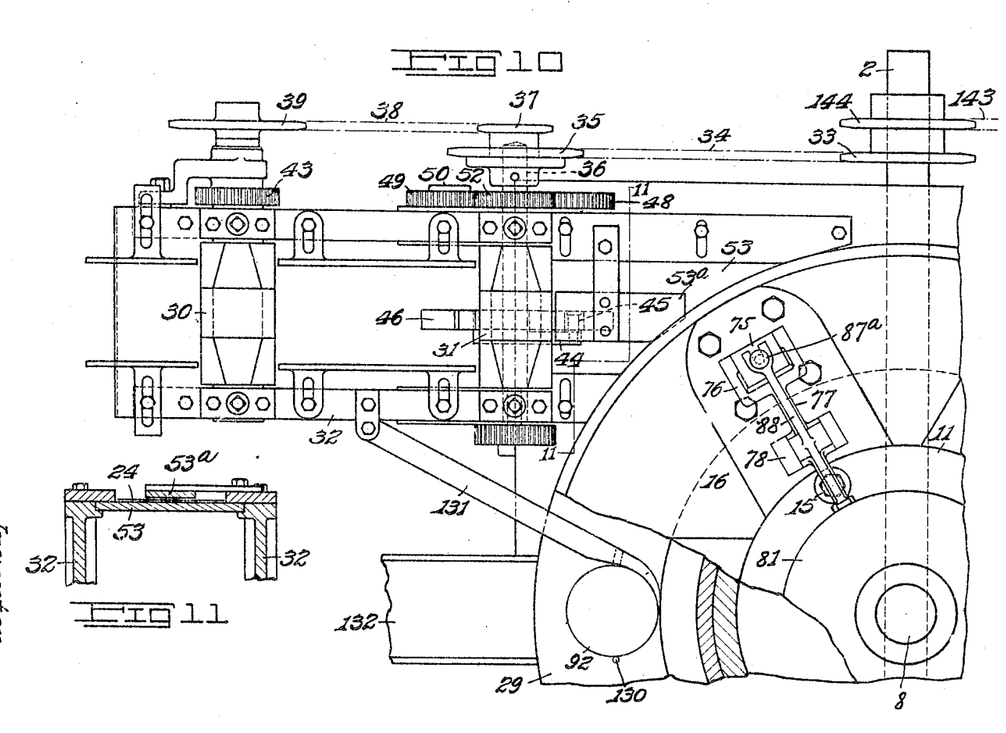
Figure 10 is an enlarged top plan view of the paper feeding mechanism.
Figure 11 is a traverse section on line 11—11, Figure 10.
Figure 12:
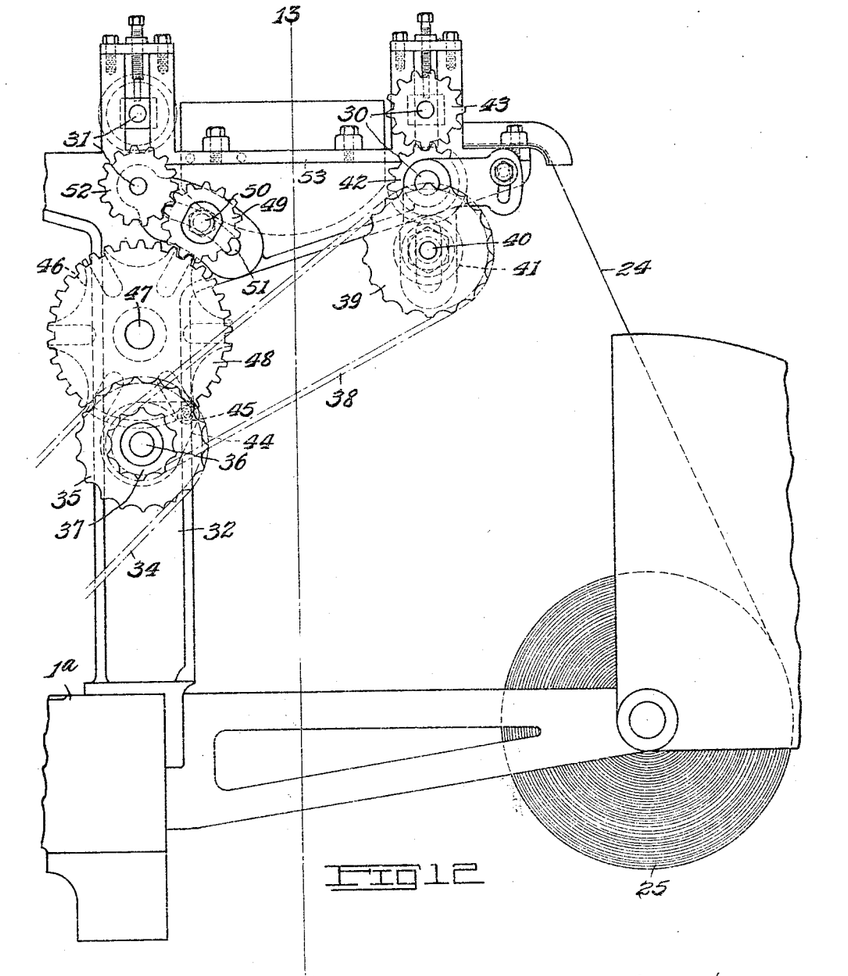
Figure 12 is a side elevation of said paper-feeding mechanism.
Figures 13, 14:
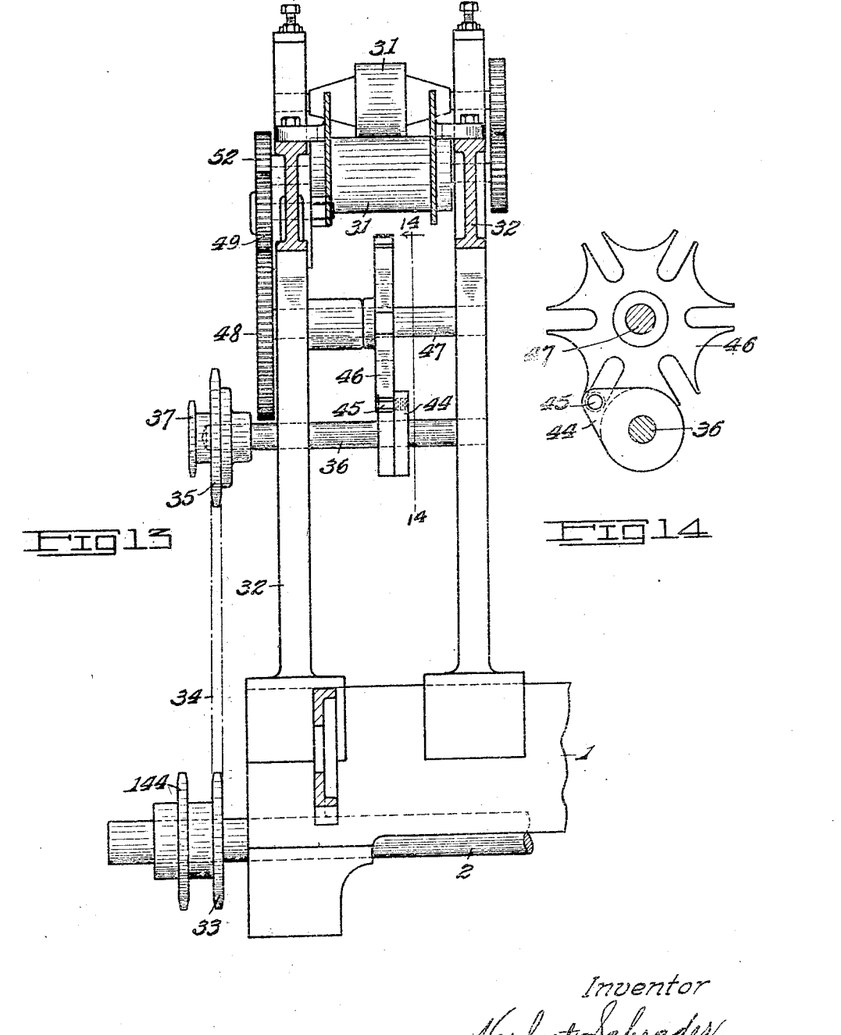
Figure 13 is a section on line 13—13, Fig. 12.
Figure 14 is a section on line 14—14, Fig. 13.
Figure 15:
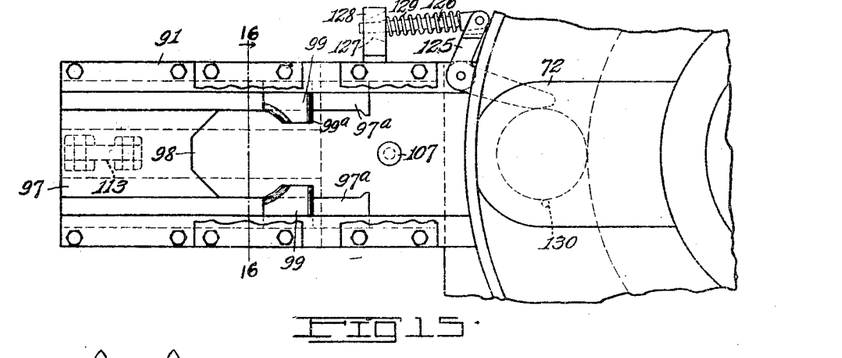
Figure 15 is a top plan view of the slide by which can covers are advanced to positions for receiving ring liners, overlying parts of the mechanism being broken away.
Figures 17, 18:
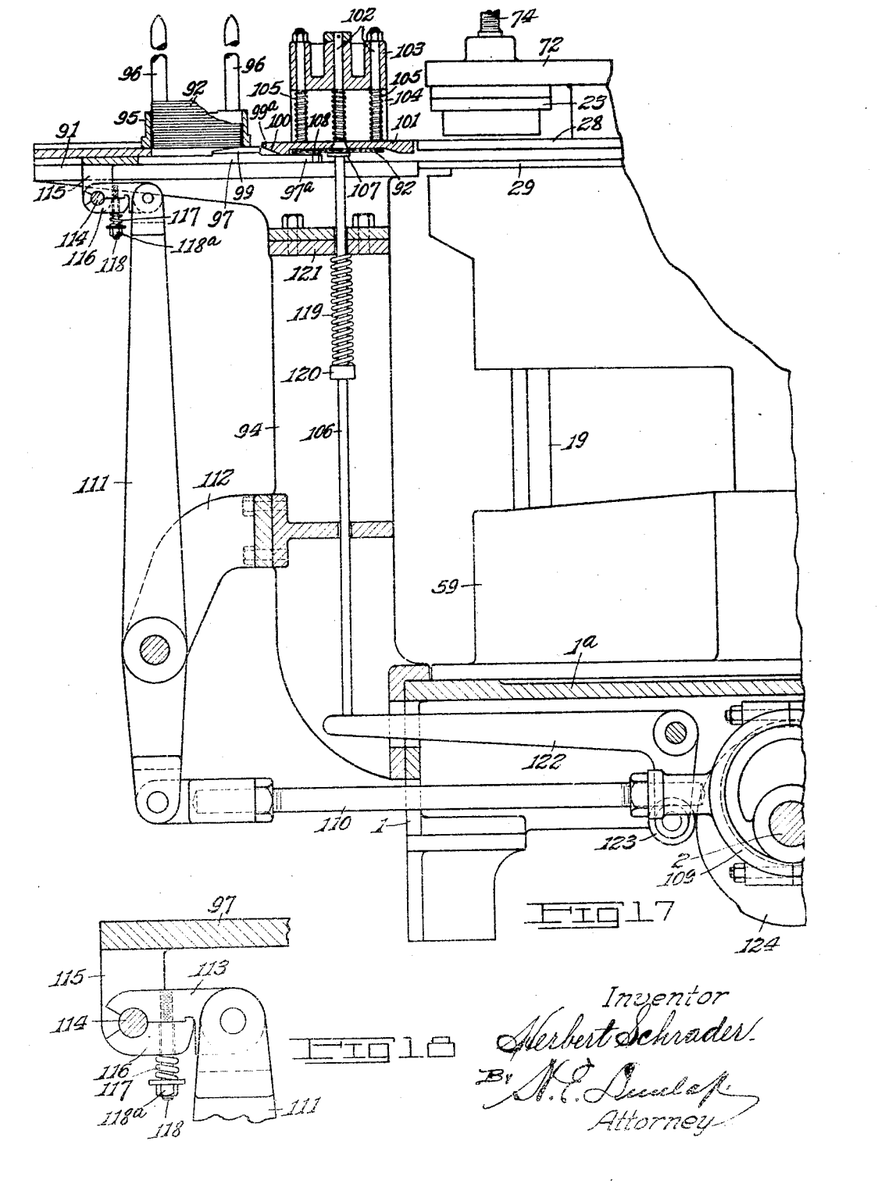
Figure 17 is a longitudinal section of the can-cover feeding mechanism.
Figure 18 is an enlarged detail view of the link connection between the cover feeding slide and its actuating mechanism.
Figures 20, 21:
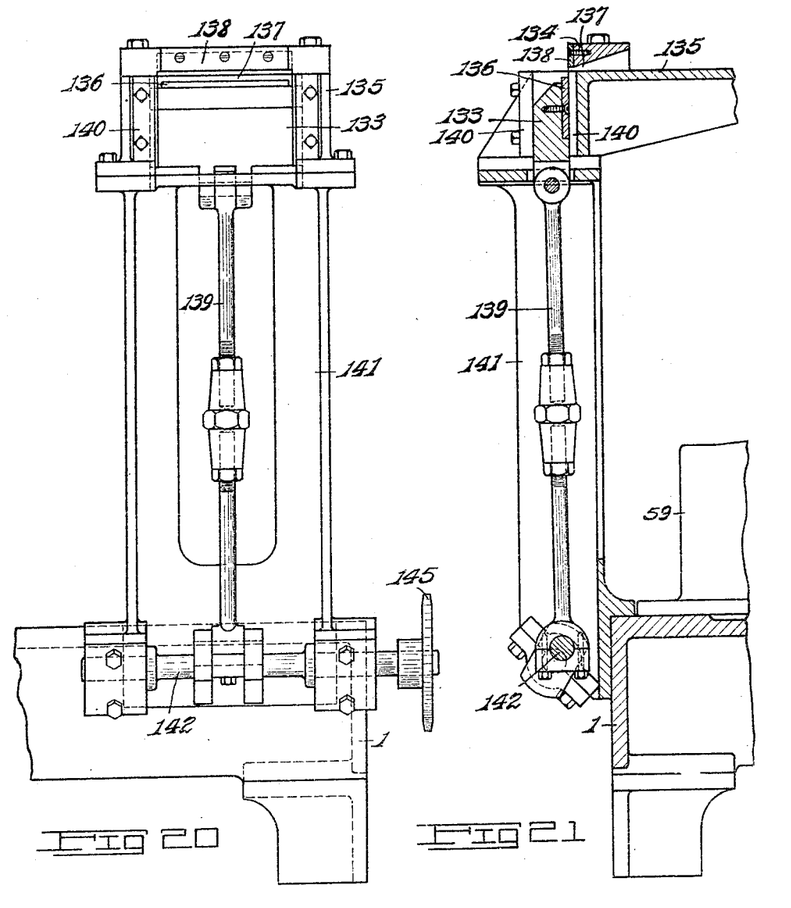
Figure 20 is an enlarged front elevation of the shearing mechanism by which waste portions are severed from the advancing web.
Figure 21 is a vertical section of the same; and—

It will be understood that, while the set 30 of paper feeding rolls is rotated continuously through the chain drive described, the set 31 is rotated intermittently at relatively higher rate of speed through the gearing which includes the Geneva drive. The intermittent rotation referred to is designed to effect intermittent feed of the paper web or strip across the ledge 28 so that the portion of said strip positioned in advance of said set 31 will remain at rest except during the intervals in which the dies act to cut liners therefrom, it being understood that said dies are carried by the continuously rotating turret 11 and that the strip must also travel at a corresponding speed during the liner-cutting operation to prevent mutilation of the strip. Between actuations of the intermittently driven rolls 31, the constantly rotated rolls 30 feed forward in the form of a loop a length of paper strip sufficient to provide for the requisite advance to be effected by the next rotary movement of the rolls 31. As is obvious, to prevent waste, the distance traversed by the paper strip at successive advance movements must be but little in excess of the diameter of the liners cut therefrom. A bed-plate 53 carried by the frame members or supports 32 intermediate the rolls 31 and the ledge 28 and located on the same level with the latter constitutes a support for the paper, and a suitably supported parallel overlying member 53a serves to maintain the strip in flat condition on said bed-plate as shown in Fig. 11.

Figures 7, 8:
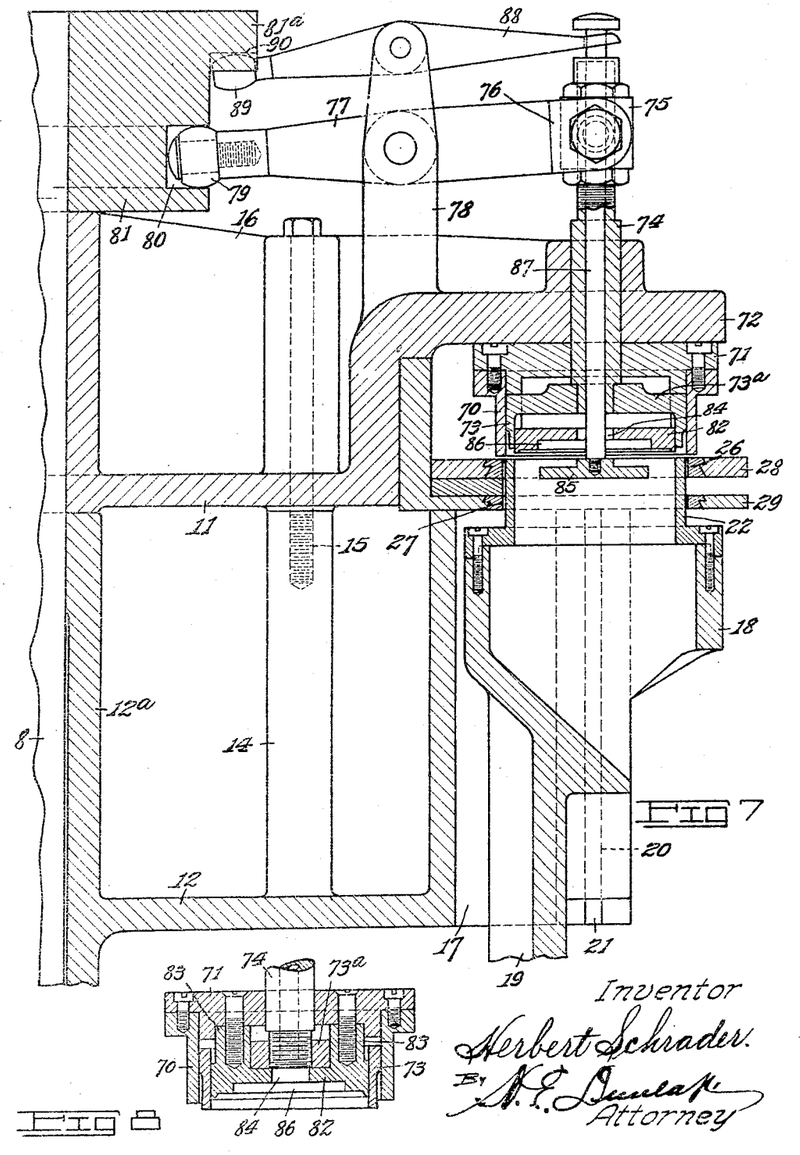
Figure 7 is an enlarged vertical section of the liner cutting mechanism.
Figure 8 is a section of the inner cutting member of the stationary die and the liner seating device, said section being taken at right angles to that in Fig. 7.
Figures 9, 16, 19:
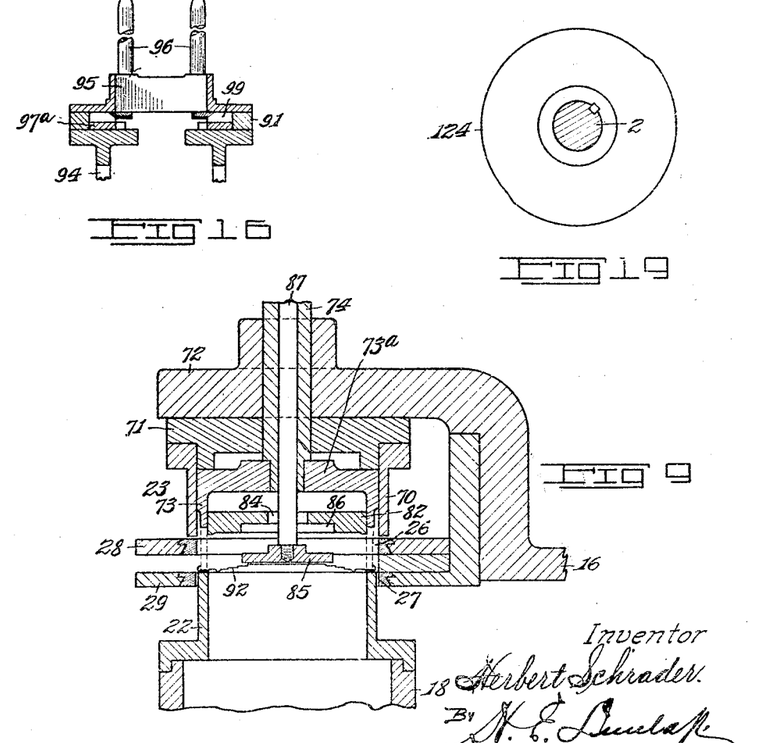
Figure 9 is a sectional view of the liner cutting mechanism showing a can cover in liner-receiving position.
Figure 16 is a transverse section on line 16—16, Fig. 15.
Figure 19 is a plan view of the cam by which said actuating mechanism is controlled.

Each plunger 19 carries upon its lower end, or has formed integral therewith, a hub 54 which has its inner end closely fitted between outwardly projecting lugs 55 carried by an upright peripheral flange 7a formed upon the bevel gear 7. A bolt or spindle 56 mounted in said hub carries on its outer projecting end an antifriction roller 57 which is disposed for travel in an internal annular channel 58 provided therefor in a cylindrical shell 59 that is mounted on the bed-plate 1a of the base 1. Substantially one-half the length of said channel 58 is located on a level at which the plunger 19 is maintained in a lowered position with the reduced cutting edge or die punch 22 disposed substantially flush with the lower ledge 29, as shown in Fig. 9. The remainder of said channel inclines upward from said level to a point at which, when reached in the travel of the roller 57, the plunger 19 is elevated with its head in a position presenting its said cutting edge or die punch substantially flush with the upper ledge 28, as shown in Fig. 7. Provided in the shell 59 at said high point of the channel 58 is a vertically extending recess or guideway 60 in which is fitted a vertically slidable member 61 having therein a transverse channel 62 which, in the normal lowered position of said member, registers with the channel 58 and which is traversed by the roller 57 in each revolution of the turret. A spindle 63 mounted in the lower end of said member 61 carries an antifriction roller 64 which is received within the uppermost part of a circular channel 65 provided in the face of a cam disk 66 which is fixed upon the drive-shaft 2 and projects upward through an opening or slot 67 provided therefor in the bed-plate 1a. The channel 65 of said cam-disk is slightly offset by the provision of an outwardly extending rounded nose or projection 68 and an opposite corresponding recess 69, the location of said offset being such that when, in the operation of the machine, a plunger and the paper web or strip are in proper relation, said nose or projection passes beneath the roller 64 of the vertically movable member 61 and effects practically instantaneous elevation of the latter. This action, due to the fact that the roller 57 of the adjacent plunger 19 at the same instant occupies a position within the channel 62 of said member 61, effects corresponding elevation of said plunger, whereby the die-punch 22 is caused to cooperate with the overhanging die 23 for cutting from the intermediate paper strip 24 an annulus or ring.

In the rapid, or practically instantaneous, reciprocation of the die punch 22, effected as aforesaid, the outer or external peripheral edge of said punch cooperates with the internal peripheral edge of a cylindrical shell or sleeve 70 which constitutes a part of said die 23, said sleeve being rigidly attached to and depending from a head-piece 71 which is carried on the under side of a horizontal arm 72 of which one is formed integral with each of the radial spider-like arms 16 of the turret 11 and extends outwardly into overhanging relation to the ledge 28 at a suitable distance above the latter. Reciprocable within said sleeve 70 is a ring-like member 73 forming part of an ejector which includes, in addition to said ring 73, an integral diametrically disposed cross member 73a, said ejector being carried upon the lower end of a hollow stem 74 which is vertically movable through the arm 72 and head-piece 71 and which has its upper end mounted in a rocker 75. Said rocker is carried between and has its bearings in the opposite parallel members of a yoke 76 formed on the outer end of a lever 77 which is pivotally mounted intermediate its ends upon a support or post 78 borne by the turret 11. The opposite, or inner, end of said lever carries an anti-friction roller 79 that is disposed for travel in a channel 80 provided annularly in a collar 81 which loosely embraces the shaft 8 and which is rigidly supported on the under side of the head portion 10a of the column 10.

The ejector has fitted within the embrace of the ring member thereof a plate 82 which has on the top face thereof a pair of oppositely disposed upstanding lugs 83 that extend through said ejector at opposite sides of the cross member 73ª and that are rigidly secured to the head-piece 71, as by means of screws, shown in Fig. 8. The lower peripheral edge of said plate 82 is located slightly below the ring 73 when the ejector occupies its normal position and slightly above the level of the lower edge of the sleeve 70, as shown in Figs. 7 and 9. Thus, when the die punch is elevated for cutting a ring liner from the paper strip, its external peripheral edge first cooperates with the internal peripheral edge of the sleeve 70 for effecting the cutting from said strip of a circular paper disk, followed instantly by the cooperation of the internal peripheral edge of said punch and the lower external peripheral edge of said plate 82 whereby is effected the cutting from said disk of the central core portion of the latter, leaving a ring or annulus of the required narrow width resting against the ejector 73 and occupying the space between the plate 82 and said sleeve 70. Due to the frictional engagement of the external and internal peripheral edges of said annulus with the sleeve 70 and plate 82, respectively, said annulus is held in place until ejected in a manner which will be described.

A knock-out plate 85 is normally disposed within a recess 86 provided therefor in the under face of said plate 82, the same being mounted upon the lower end of a rod or stem 87 which is vertically movable through the hollow or bore of the stem 74 and through an opening 84 provided centrally in said plate 82. Said knock-out plate 85 is normally supported in the elevated position mentioned by means of a lever 88 which is pivoted intermediate its ends upon the top of the post 78, said lever having its outer end forked and disposed in underlying supporting relation to a head 87ª provided on the stem 87. An antifriction roller 89 carried on the inner end of said lever 88 is disposed for travel against the underside of an overhanging ledge 81ª formed annularly on the collar 81. A recess or pocket 90 provided in said under side of the ledge 81ª is located to receive momentarily the roller 89 at the proper moment for allowing the lever 88 to swing on its mounting to permit the rod or stem 87 to drop, whereby the knock-out plate 85 is projected downward for thrusting the cut out center or core of the paper disk downward into the hollow of the head 18 of the plunger 19, whence said core will gravitate downward and discharge outward over the inclined wall 18ª.

Following the cutting of the ring liner, as aforesaid, said liner is carried in the space hereinbefore mentioned between the plate 82 and the sleeve 70 until a position is assumed in which the overhanging arm 72 is alined with a capfeeding table, generally designated by the numeral 91, in which position a can cover or cap 92, positioned in a manner which will hereinafter be described, is located directly upon the top of the die punch 22, as shown in Fig. 9. At said point in the operation of the machine, the roller-carrying inner end of the lever 77 momentarily mounts a small knob-like elevation 93 provided in the channel 80, causing said lever to be rocked on its pivotal mounting for momentarily depressing, through the intermediate hollow stem 74, the ejector 73, whereby the previously-cut ring liner, held as aforesaid, is thrust downward to a position in which it is pressed into or deposited in a channel provided, as ordinarily, in the circumferential edge portion of said can-cover, the die punch 22 and knock-out plate 85 at such time occupying their elevated positions to meet said ejector.

The mechanism whereby the covers or caps are fed to the position indicated comprises the feed-table 91 which surmounts one or more suitable supporting brackets or standards 94 mounted upon a side of the base 1, said table having its inner end closely approaching the outer edge of and located on the same horizontal plane with the ledge 29. Mounted stationarily over said table is a cage-like support or holder for a large number of caps 92 arranged in stacked relation, said holder as herein shown comprising a hollow cylindrical shell 95 surmounted by a plurality of upright posts 96. Horizontally slidable upon said table beneath the lower end of said cap holder is a slide 97 adapted to be actuated for dislodging the lowermost cap in the stack and for advancing such cap toward the ledge 29. Said slide consists of a flat plate which has its front end divided to form separated fingers 97ª and is shaped intermediate its ends to provide a partially enclosed pocket 98 adapted for the reception of such lowermost cap and into which such cap drops when the stack and said pocket are in registering alinement. Following deposit of the cap in said pocket, the slide is actuated to move inward over the table for carrying the dislodged cover to an advanced position on the latter. As said slide is so advanced, beveled or inclined surfaces 99ª provided on the front ends or edges of inturned lips 99 carried by the fingers 97ª engage the beveled under face 100 provided on the outer end of a plate 101 which overlies the table adjacent to the ledges 28 and 29 borne by the turret 11 and which is carried upon the lower ends of a plurality of rods or bolts 102. Said bolts are vertically movable through an elevated bearing head 103 which has legs 104 mounted in an out-of-the-way position, as upon the outer lateral edges of the table 91. Spiral bolt-encircling springs 105 interposed between the plate 101 and the bearing head 103 normally maintain said plate depressed under yielding tension. Elevation of said plate against the tension of said springs is affected by the advancing slide 97 which, as previously stated, presents to the beveled edge 100 thereof the beveled lips 99 borne by the fingers 97ª whereby said slide enters beneath said plate. When said slide has reached the limit of its forward movement, a rod 106 which extends vertically through the table and which has a head 107 thereof centrally underlying the so-advanced cap is elevated, whereby said cap is lifted from the pocket 98 into a central recess 108 provided therefor in the under face of said plate 101, in which position it is clear of said slide so that the latter is free to retract. As the next succeeding cap is advanced in the manner described, the front ends of the fingers 97ª of the slide engage the rear edge of the then lowered cap and effect the advance of the latter to a position on the ledge 29.

The mechanism by which the slide 97 is advanced and retracted, as aforesaid, comprises an eccentric 109 mounted upon the drive-shaft 2 and having attached thereto one end of a rod 110 which has pivotally attached to its opposite end the lower end of a substantially upright lever 111 that is pivotally mounted intermediate its ends upon an outwardly directed arm 112 carried by the bracket or standard 94. The upper end of said lever 111 is pivotally attached to the front end of a link 113 which has its opposite end loosely disposed in overlying relation to a laterally extending wrist-pin 114 carried by a depending tail-piece 115 formed on the under side of the rear end portion of the slide 97. As is obvious, rotation of the drive shaft 2 imparts reciprocating motion to the rod 110 whereby like motion is communicated to the slide 97 through the intermediate lever 111 and link 113.

To provide for the slight elevating and lowering movements of the link 113 which necessarily are produced by the rocking of the lever 111, without communicating to the slide 97 like movements which would interfere with free sliding movement of said slide, the tail-piece 115 has formed on a lateral face thereof an integral upwardly facing ledge 116 having its upper face, or that portion of said face that is adjacent to the wrist-pin 114, in the horizontal plane of the axis of said pin. The lower edge of the rear portion of said link normally rests upon said upper face of said ledge and in embracing overlying relation to the upper half of said pin, being normally held in said position under the yielding tension exerted by a spiral spring 117. A bolt 118, which has its upper end threaded into said link 113, is directed vertically through and is loosely received by said ledge 116 and carries said spring 117 between the under side of said ledge and a head or nut 118ª carried by the lower end thereof, as shown. As is apparent, the link, retained in seated relation to the wrist-pin by the bolt and spring structure described, is permitted to rock on said pin as an axis in the upward and downward swinging movements induced by the rocking of the attached end of the lever 111 throughout the arc of a circle.

The rod 106 whereby the can covers or caps are elevated into the recess 108 in the plate 101, and whereby such cap and said plate are elevated against the tension of the springs 105, is normally held in a lowered position by means of a spiral compression spring 119 carried thereby between a fixed collar 120 thereon and a lug or web 121 through which said rod is vertically movable, said web being carried by the table-supporting brackets 94. The lower end of said rod rests upon the substantially horizontal long arm of a bell-crank lever 122 which is pivotally mounted upon a depending web portion of the base 1 and which carries upon its depending short arm a roller 123. Said roller permanently rides upon the peripheral edge of a disk-like cam 124 which is fixed on the drive-shaft 2 and which is shaped to produce actuation of said bell-crank for effecting elevation and lowering of the rod 106 at properly timed intervals and to maintain the position of said rod throughout definite periods.

A lever 125 of bell-crank form is pivoted on a lateral edge portion of the front end of the feed table 91 and has an arm thereof closely overlying the ledge 29, while the opposite arm thereof is pivotally attached to an end of a rod 126 which has its opposite end portion longitudinally movable through a cone member 127. Said cone is seated in a socket provided therefor in an arm or lug 128 carried by said table, and interposed between said cone and the pivotally attached end of said rod 126 is a rod-encircling compression spring 129 which tends to normally hold said bell-crank 125 in a position in which its ledge-overlying arm cooperates with an upright pin or stud 130 carried on the ledge 29 for positioning in overlying seated relation to the die-punch 22 the fully advanced can cover or cap. Immediately following such positioning of the cap, the knock-out plate 85 is again actuated to descend to a point in which it seats firmly upon the central portion of the so-positioned cap, as shown in Fig. 9, for holding the latter in place during the ring liner applying operation. The ledge 81ª of the collar 81 is of reduced thickness at one side so that the lever 88 is permitted to swing out of supporting relation to stem 87, whereupon said stem is depressed through engagement of its head 87ª with the under side of a bar 146 which overhangs its path of travel, being mounted upon a suitable support, as on the under side of the column 10. It is here pointed out that the annular ring portion of the ejector 73 has its extreme lower edge of such less diameter than the external diameter of the ring liner that, as indicated in Fig. 9, it will be received within the embrace of the curled peripheral edge of the cap as it thrusts said liner to the inserted position in which the outer edge of the latter is received beneath said curled edge.

Figure 1:
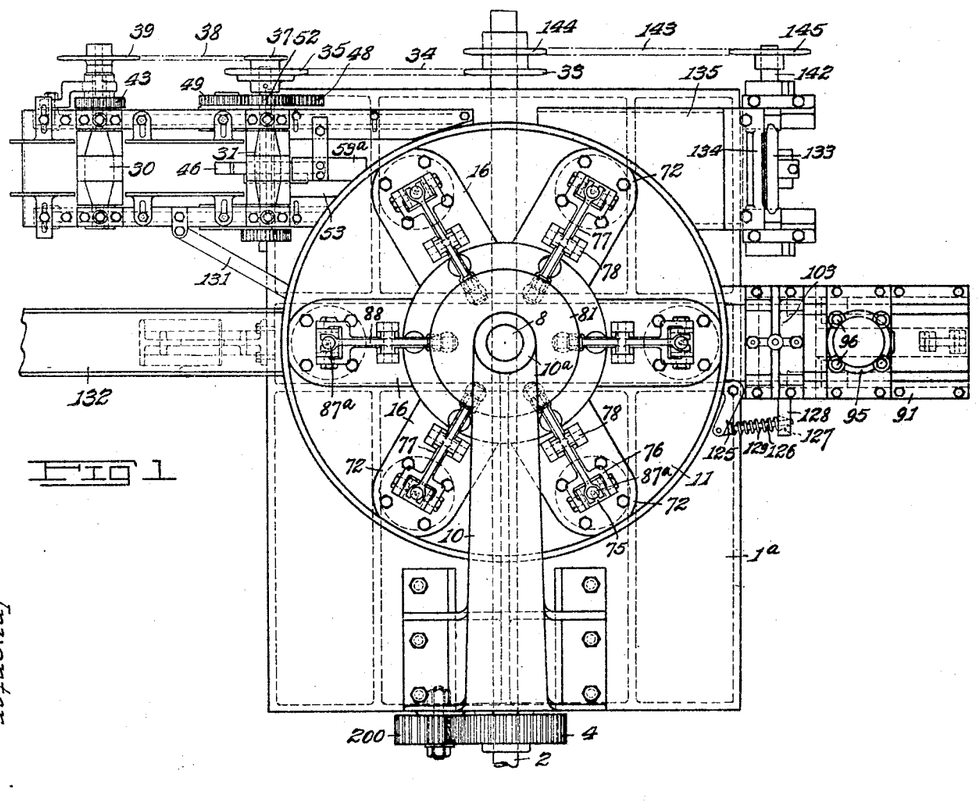
Figure 1 is a top plan view of the machine.
Figure 2:
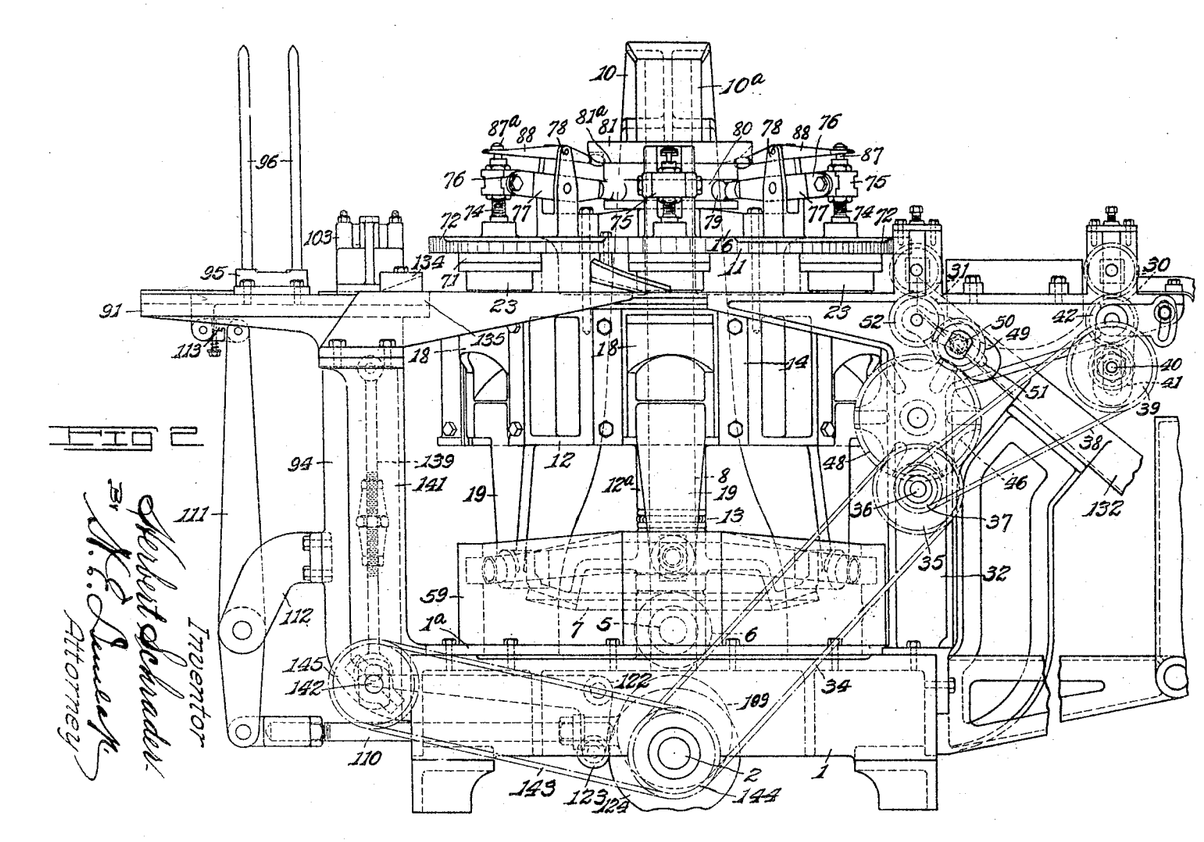
Figure 2 is a side elevation of the same.
Figure 3:
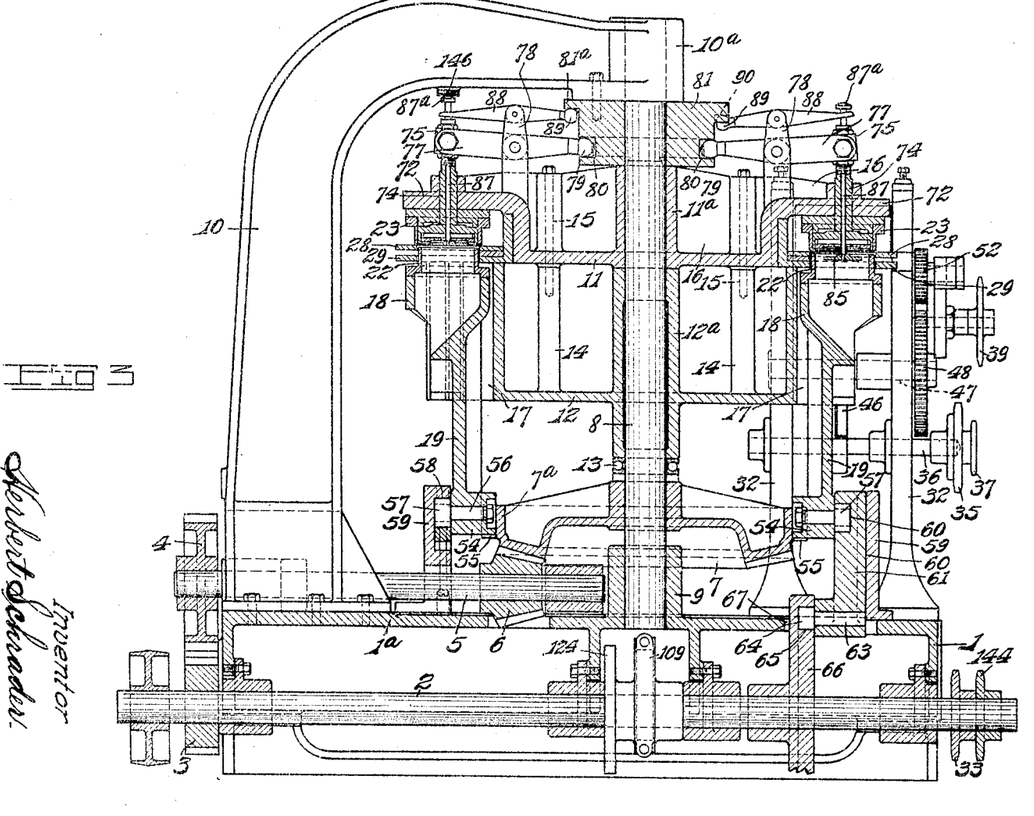
Figure 3 is a longitudinal section.
Figure 4:
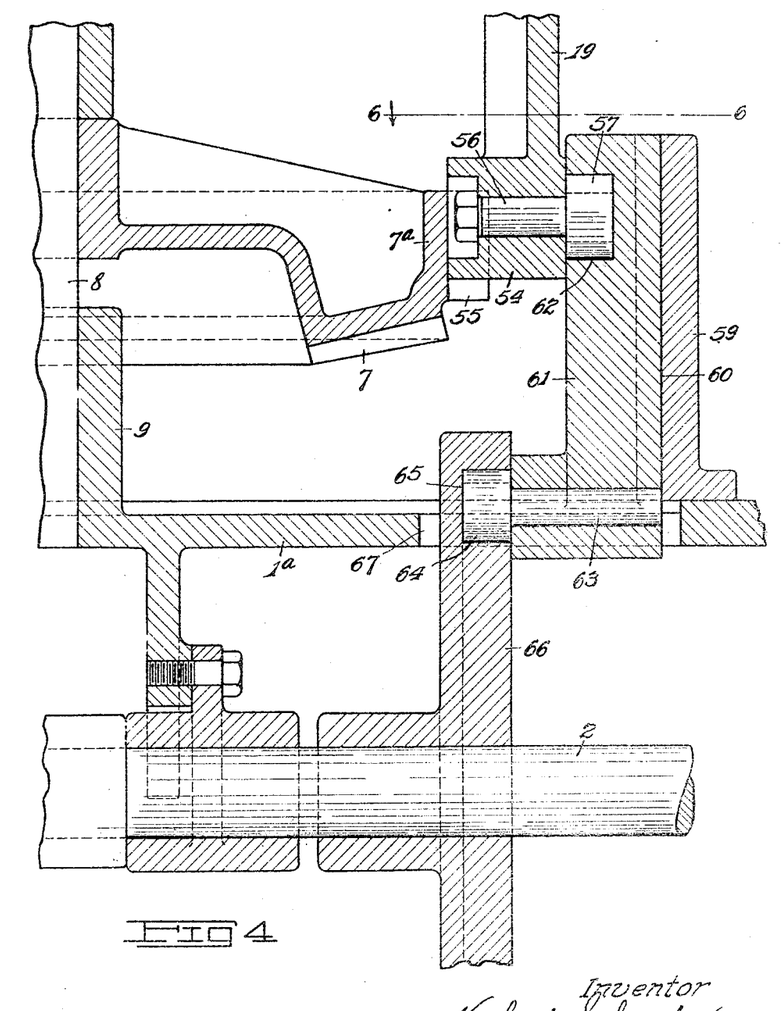
Figure 4 is an enlarged detail section of the mechanism by which reciprocation of the die-punches is effected.
Figures 5, 6, 22:
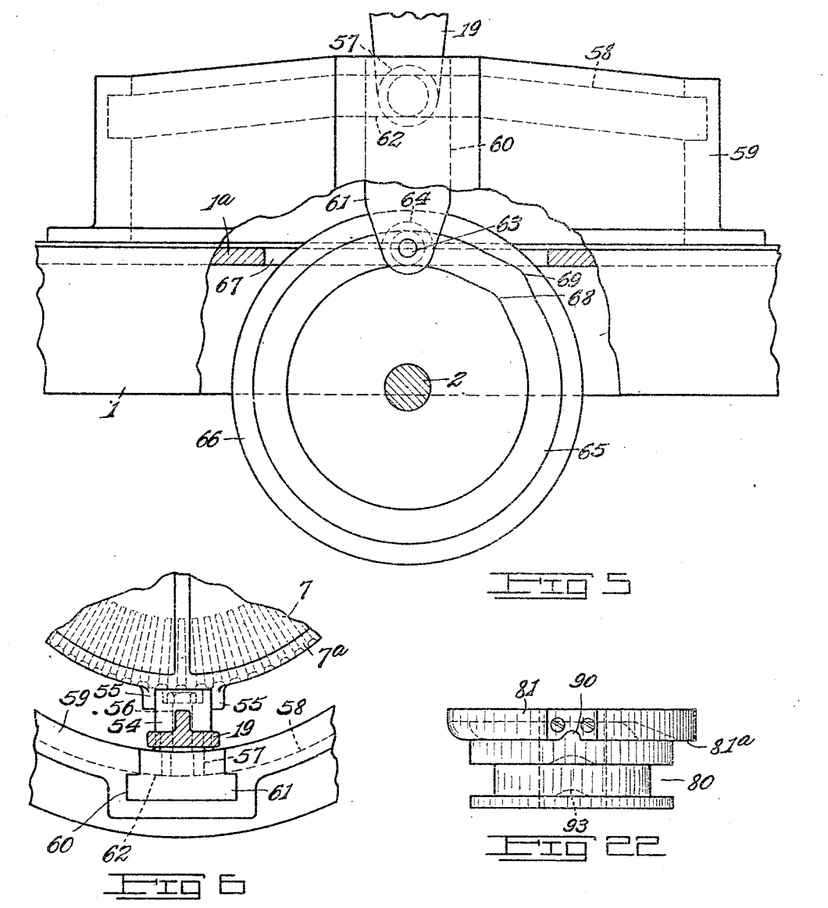
Figure 5 is a detail sectional elevation of parts of said mechanism.
Figure 6 is a section on line 6—6, Fig. 4.
Figure 22 is an enlarged side elevation of the lever actuating collar.

Immediately following the deposit of a ring liner in the channel of the cap, the knock-out plate 85 is returned to its normal elevated position. The cap so acted upon is carried by the ledge 29, or by the die punch 22 which extends through said ledge, and has the rearmost portion of its peripheral edge resting against said pin or stud 130. So carried, the cap rides upon said ledge throughout approximately a one-half revolution of said ledge, or until it strikes against a cap-dislodging arm 131 which has its inner end disposed in overriding relation to said ledge, being rigidly mounted in an appropriate position, as on a side of the support for the paper-feeding rolls, and extending in an inwardly and rearwardly inclined direction. Said arm is inclined in such relation to the approaching cap advanced ahead of the stud 130, as aforesaid, that it constitutes a stop adapted to co-operate with the stud 130 for deflecting said cap from said ledge to a delivery chute 132, the latter being located adjacent to said roll support, as shown in Figs. 1, 2 and 10.

To obviate possible impediment to the free travel of the paper web or strip 24 which might otherwise result, the waste front end portions thereof from which ring liners have been cut, as aforesaid, are periodically severed. The mechanism by which this severance is accomplished comprises a movable shear member 133 which cooperates with a stationary shear member 134 mounted upon a table 135 which is suitably supported in a position opposite to and in alinement with the bed-plate 53 of the paper-feed mechanism, as shown in Fig. 1. Said stationary shear member 134 has a cutting blade 138 detachably mounted on its outer face over the front end of a gradually tapered passage or throat 137 through which the paper web passes. A cutting blade 136 carried on the inner face of the vertically movable shear member 133 is designed to coact with said blade 136 for effecting the shearing off of lengths of paper which have passed through said throat 137. Said shear member 133 is carried upon the upper end of a rod or pitman 139 and is reciprocable between guide members 140 carried upon the upper end of an upright supporting bracket or brackets 141 mounted on the base 1. The lower end of said pitman is mounted upon the crank of a crank-shaft 142 journaled in suitable bearings carried on the lower end portion of said bracket 141, continuous rotation being communicated to said crank-shaft from the drive-shaft 2 through a sprocket chain 143 connecting sprocket-wheels 144 and 145 carried, respectively, by said drive-shaft and said crank-shaft.

The operation of the machine as a whole may be briefly described, thus: Each of the dies 23 carried by the continuously rotated turret or carrier 11 approaches the path of feed of the paper strip or web 24 across the ledge 28 with its ejector member 73 held in an elevated position, and the die punch 22 which cooperates therewith is at the same time maintained in a lowered position. Thus the said parts ride over said web without catching upon or otherwise interfering with the latter. When the die has reached a position wholly overhanging said web, the cooperating die punch is thrust upward with respect thereto and effects cutting of a ring liner from the intermediate web, following which said punch is immediately withdrawn, leaving said ring liner frictionally held between the sleeve 70 and the plate 82. Immediately thereafter, the knock-out plate 85 is instantly actuated downward and dislodges the central disk-like core which remains within the hollow of the punch. Contemporaneously with the ring cutting operation the intermittently driven rolls 31 act to feed the paper web across the ledge 28 at a rate of speed at least equal to that of the travel of the die, thus to obviate mutilation of said web, such advance of the web being continued throughout a distance at least equaling the diameter of the ring cut therefrom.

As the die carrying the ring liner approaches the feed-table 91, a can cover 92 is advanced from said feed-table to the ledge 29 directly in front of said die in the manner hereinbefore described and is held by the bell-crank 125 against advance movement with said ledge until engaged by the stud 130, at which time said cover is accurately positioned in overlying seated relation to the die punch 22. At the instant that the cover is so positioned, the knock-out plate 85 is actuated to seat upon said cover and holding the latter firmly in place, following which the ejector 73 is depressed, thrusting the ring liner downward, and simultaneously with this depression the die punch 22 and knock-out plate 85 are together elevated, carrying the cover into meeting relation with said ejector, whereby is effected the deposit of said ring liner in the circumferential channel of the cover.

Having been promptly returned to the level of the ledge 29 by the return downward movement of the underlying punch 22, the cover is carried around in the rotation of said ledge until it engages the dislodging arm 131 which, in conjunction with the stud 130, acts to deflect said cover from the ledge to the delivery chute 132.

It will of course be understood that the various mechanisms hereinbefore described are arranged to operate in timed relation so that all of the various steps and operation involved are performed in accurately timed sequence and in intervals of definite duration during the continuous, or uninterrupted, rotation of the turret.

What is claimed is—

1. A machine for cutting and applying ring liners to can covers, comprising a continuously traveling carrier, a plurality of sets of die and punch members borne by said carrier, mechanism for actuating said punch members into cooperative relation to said die members for cutting ring liners from a web of gasket material, means for advancing said web to position between said members, and means whereby said die members are caused to seat said liners on the can covers.

2. A machine for cutting and applying ring liners to can covers, comprising a continuously traveling carrier, a plurality of sets of die and punch members borne by said carrier, mechanism for actuating said punch members into cooperative relation to said die members for cutting ring liners from a web of gasket material, means operating intermittently to feed said web to position between said members and to advance the same during the cutting operation, and means for actuating said members to effect seating of said liners on the can covers.

3. A machine for cutting and applying ring liners to can covers, comprising a continuously rotated carrier, a plurality of sets of die and punch members borne by said carrier, mechanism for actuating said punch members into cooperative relation to said die members for cutting ring liners from a web of gasket material, means for feeding said web to a position crossed by said members in their travel, said feeding means acting intermittently to advance said web with said members during the cutting operation, means for positioning a cover beneath each die member following the ring cutting operation, and means for actuating such die member to seat the cut ring upon the positioned cover.

4. In a machine for cutting and applying ring liners to can covers, a die, a reciprocating punch arranged to cooperate with said die for cutting at a single operation a ring liner from a web of gasket material, means including said punch for positioning a can cover beneath said die following the cutting operation, means reciprocable into seated relation to said cover for maintaining the latter so positioned, said die including a reciprocable member, and means for reciprocating said member for seating the cut ring liner in the can cover.

5. In a machine for cutting and applying ring liners to can covers, a die embodying relatively spaced cutting members, a punch reciprocable into cooperative relation to said members for cutting at a single operation a ring liner from a web of gasket material, means for positioning a can cover beneath said die, reciprocable means for seating upon said cover for retaining the latter against movement in said position, and a reciprocable member disposed between said die members and operable for thrusting the cut ring liner into seated position on said cover, said reciprocable member being normally held in a retracted position permitting temporary frictional retention of the liner between said cutting members.

6. In a machine for cutting and applying ring liners to can covers, a constantly rotated carrier, a plurality of dies borne by said carrier, each die embodying relatively spaced cutting members, a punch reciprocable into cooperative relation to the members of each die for cutting a ring liner from a web of gasket material, means for intermittently advancing said web, said advancing means being timed to operate during the cutting operation, means for positioning a can cover beneath said die, a normally retracted liner-applying device disposed between said cutting members, and means for reciprocating said device for seating the cut liner on said cover.

7. In a machine for cutting and applying ring liners to can covers, a constantly rotated carrier, a plurality of dies borne by said carrier, each die embodying relatively spaced cutting members, a punch reciprocable into cooperative relation to the members of each die for cutting a ring liner from a web of gasket material, means continuously unwinding said web from a roll of the material, means intermittently advancing the end portion of said web, said advancing means being timed to operate during the cutting operation, and a device acting to thrust the cut liner into seated position on a can cover positioned beneath said die.

8. In a machine for cutting and applying ring liners to can covers, a constantly rotated carrier, a plurality of dies borne by said carrier, each die embodying relatively spaced cutting members, a punch reciprocable into cooperative relation to the members of each die for cutting a ring liner from a web of gasket material, mechanism for feeding said web into position between said die and said punch, a means for seating the cut liner on said cover, said feeding mechanism comprising two sets of web-advancing rolls, one set being continuously rotated and the other set being rotated intermittently.

9. In a machine for cutting and applying ring liners to can covers, a constantly rotated carrier, a plurality of dies borne by said carrier, each die embodying relatively spaced cutting members, a punch reciprocable into cooperative relation to the members of each die for cutting a ring liner from a web of gasket material, mechanism for feeding said web into position between said die and said punch, and means for seating the cut liner on said cover, said feeding mechanism comprising two sets of web-advancing rolls, one of said sets being rotated intermittently and timed to advance the web during the cutting operation and operating to effect such advance at a speed not less than that of the travel of the die.

10. In a machine for cutting and applying ring liners to can covers, a stationary die, a punch reciprocable into cooperative relation to said die for cutting a ring liner from a web of gasket material, means for positioning said web between said punch and said die, said die having relatively spaced cutting members and being adapted to carry the cut liner between said members following the cutting thereof, means for depositing a can cover on said punch, means seating upon said cover for retaining it in place, a reciprocable liner-ejecting device located between said cutting members and behind the liner-carrying position and means for actuating said device to thrust said liner from said position into seated position upon a can cover.

11. In a machine for cutting and applying ring liners to can covers, a stationary die, a punch reciprocable into cooperative relation to said die for cutting a ring liner from a web of gasket material, means for positioning said web between said punch and said die, said die having relatively spaced cutting members and being adapted to carry the cut liner between said members following the cutting thereof, means for positioning a can cover beneath said die, means located inwardly of the inner of said cutting members for seating upon and holding said cover in place, means for actuating said holding means, and a reciprocable liner-ejecting device located between the cutting members and behind the liner-carrying position whereby said liner is deposited upon said cover.

12. In a machine for cutting and applying ring liners to can covers, a stationary die, a punch reciprocable in cooperative relation to said die for cutting a ring liner from a web of gasket material, means for positioning said web between said punch and said die, said die having relatively spaced cutting members and being adapted to carry the cut liner between said members following the cutting thereof, means for positioning a can cover beneath said die, reciprocable cover holding means, and means for forcing the liner from liner-carrying position to a seated position on the can cover.

13. A machine for cutting and applying ring liners to can covers, comprising a continuously rotated carrier, die and punch members borne by said carrier, means for actuating said punch members into cooperative relation to said die members for cutting ring liners from a web of paper, means intermittently advancing said web to cutting position, said die members being arranged to temporarily carry cut liners following the cutting thereof, means for positioning can covers beneath said dies, means associated with said dies for thrusting the cut liners to seated position on the can covers, and means for shearing waste lengths from said web following the cutting operations.

14. A method of cutting and applying ring liners to can covers, which consists in intermittently feeding a strip of gasket material across the path of movement of continuously rotated liner-forming elements, actuating said elements to cut a liner from said strip at a single operation during the advance movement of the latter, introducing a can cover between and in the axial line of said elements, and then forcing said liner from the place of forming to a seated position on the can cover.

15. A method of cutting and applying ring liners to can covers, which consists in intermittently feeding a strip of gasket material across the path of movement of continuously rotated liner-forming elements, actuating said elements to cut a liner from said strip at a single operation during the advance movement of the latter and forcing said liner to a position in which it is frictionally supported, introducing a can cover between and in the axial line of said elements, and then forcing said liner from its frictionally supported position to a seated position on the can cover.

In testimony whereof, I affix my signature in presence of two subscribing witnesses.

HERBERT SCHRADER.

Witnesses:
H. E. DUNLAP,
CHARLES P. SCHLICK.